United States Patent
Liu et al.

(10) Patent No.: US 7,854,187 B2
(45) Date of Patent: Dec. 21, 2010

(54) ROTARY WORKTABLE POSITIONING STRUCTURE FOR MITER SAW

(75) Inventors: Chia-Sheng Liu, Chiayi County (TW); Yi-Li Cheng, Taichung County (TW)

(73) Assignee: Durq Machinery Corp., Taichung (TW)

( * ) Notice: Subject to any disclaimer, the term of this patent is extended or adjusted under 35 U.S.C. 154(b) by 322 days.

(21) Appl. No.: 12/155,591

(22) Filed: Jun. 6, 2008

(65) Prior Publication Data
US 2009/0205474 A1 Aug. 20, 2009

(30) Foreign Application Priority Data
Feb. 20, 2008 (TW) .............................. 97105958 A

(51) Int. Cl.
*B23D 45/14* (2006.01)
(52) U.S. Cl. ..................... 83/471.3; 83/473; 83/581
(58) Field of Classification Search .............. 83/471.2, 83/471.3, 472, 473, 477, 477.1, 486, 486.1, 83/581
See application file for complete search history.

(56) References Cited

U.S. PATENT DOCUMENTS

| 4,011,782 | A | * | 3/1977 | Clark et al. ................ 83/471.3 |
| 4,152,961 | A | * | 5/1979 | Batson ..................... 83/471.3 |
| 7,331,264 | B2 | * | 2/2008 | Ozawa et al. .............. 83/471.3 |
| 2003/0200852 | A1 | * | 10/2003 | Romo ......................... 83/473 |
| 2004/0154448 | A1 | * | 8/2004 | Romo et al. ............... 83/471.3 |
| 2005/0262984 | A1 | * | 12/2005 | Hetcher et al. ............ 83/471.3 |
| 2006/0000330 | A1 | * | 1/2006 | Terashima et al. ......... 83/471.3 |

* cited by examiner

*Primary Examiner*—Stephen Choi
(74) *Attorney, Agent, or Firm*—Bacon & Thomas, PLLC

(57) ABSTRACT

A rotary worktable positioning structure used in a miter saw is disclosed to include a first positioning unit controllable by biasing a handle to lock the worktable to the machine base or to unlock the worktable for free rotation, and a second positioning unit controllable by rotating a switching wheel to move a lock pin into one of a number of locating holes on the periphery of the machine base and to further lock the worktable in one of a number of predetermined cutting angles.

13 Claims, 8 Drawing Sheets

US 7,854,187 B2

ROTARY WORKTABLE POSITIONING STRUCTURE FOR MITER SAW

BACKGROUND OF THE INVENTION

1. Field of the Invention

The present invention relates to a miter saw and more particularly, to a rotary worktable positioning structure for miter saw for controlling the positioning of the worktable.

2. Description of the Related Art

To facilitate adjustment of the clamping angle of the workpiece for enabling the workpiece to be cut obliquely, a miter saw has the workpiece carrying worktable rotatably mounted on the machine base, and is provided with a positioning structure for locking the workpiece to said machine base. This positioning structure comprises a screw rod coupled to the worktable. The screw rod can be rotated forwards and stopped against the periphery of the machine base to lock the worktable. It is inconvenient to lock the worktable to the machine base by means of rotating the screw rod. Further, when stopping the screw rod against the periphery of the machine base, the periphery of the machine base may be damaged. Further, this design does not allow the user to lock the worktable to the machine base in a specific cutting angle (for example, 15-degrees or 30-degrees) rapidly.

Therefore, it is desirable to provide a rotary worktable positioning structure for miter saw that eliminates the aforesaid drawbacks.

SUMMARY OF THE INVENTION

The present invention has been accomplished under the circumstances in view. It is one object of the present invention to provide a rotary worktable positioning structure for miter saw, which is easy to operate and, which positively locks the worktable of the miter saw in the desired cutting angle position.

To achieve this and other objects of the present invention, the rotary worktable positioning structure is used in a miter saw having a machine base and a worktable e rotatably supported on the machine base. The rotary worktable positioning structure comprises a first positioning unit and a second positioning unit. The first positioning unit comprises a handle and a locating block. The handle is pivotally connected to the front side of the worktable with a first pivot pin, and turnable relative to the worktable between a lowered position and a lifted position. The locating block is stopped against the periphery of the machine base when the handle is in the lowered position. When the handle is in the lifted position, the locating block is kept apart from the periphery of the machine base. The second positioning unit comprises a switch wheel, a lock pin, and a plurality of locating holes formed on and spaced around the periphery of the machine base. The switch wheel is coupled to the first pivot pin, and turnable about the first pivot pin between an inward position and an outward position. The lock pin is engaged into one locating hole of the machine base when the switch wheel is in the inward position. When the switch is in the outward position, the lock ping is kept apart from the locating holes of the machine base.

DETAILED DESCRIPTION OF THE INVENTION

Figure 1:
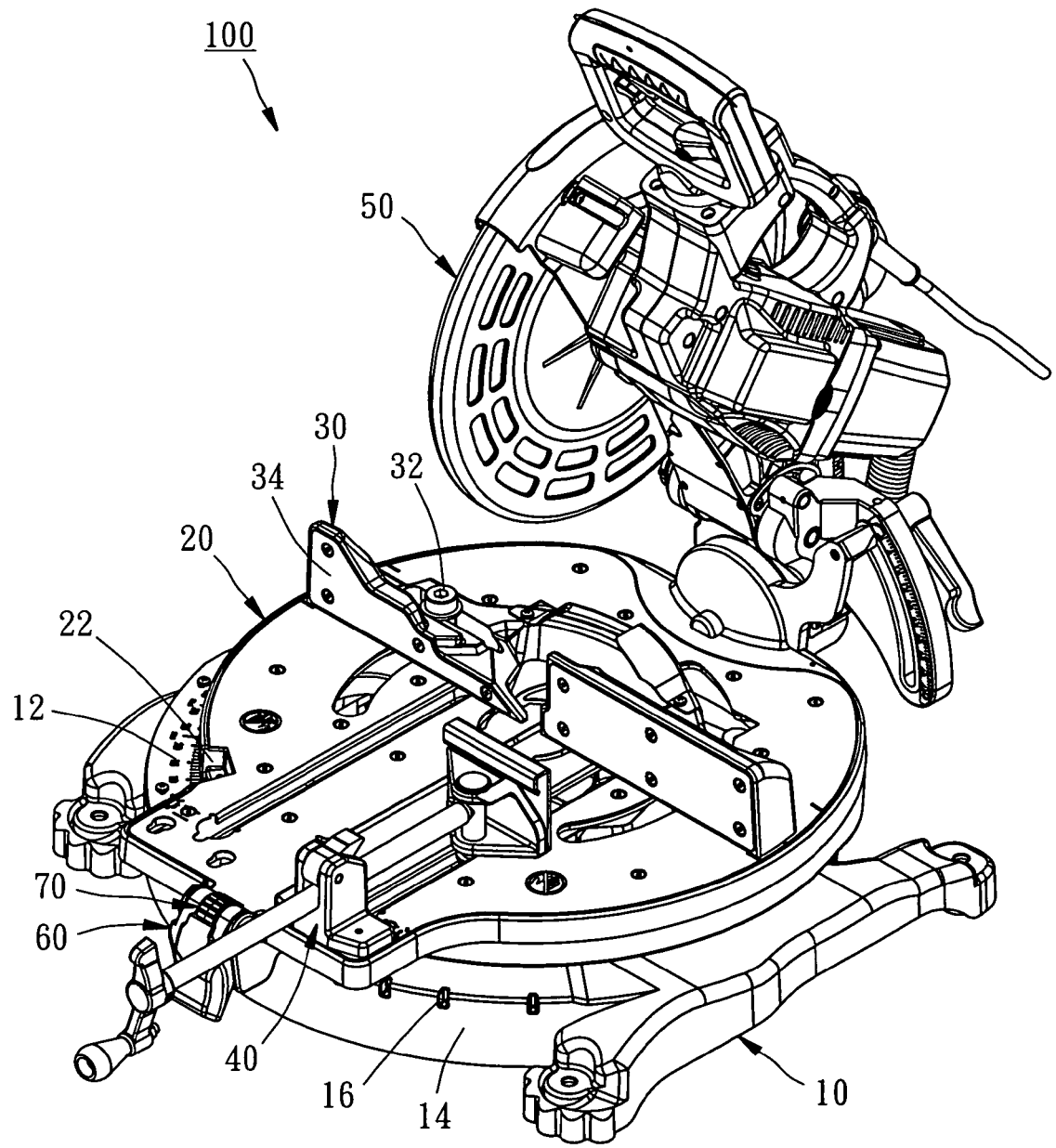
FIG. 1 is an elevational view of a miter saw constructed according to the preferred embodiment of the present invention.
Figure 2:
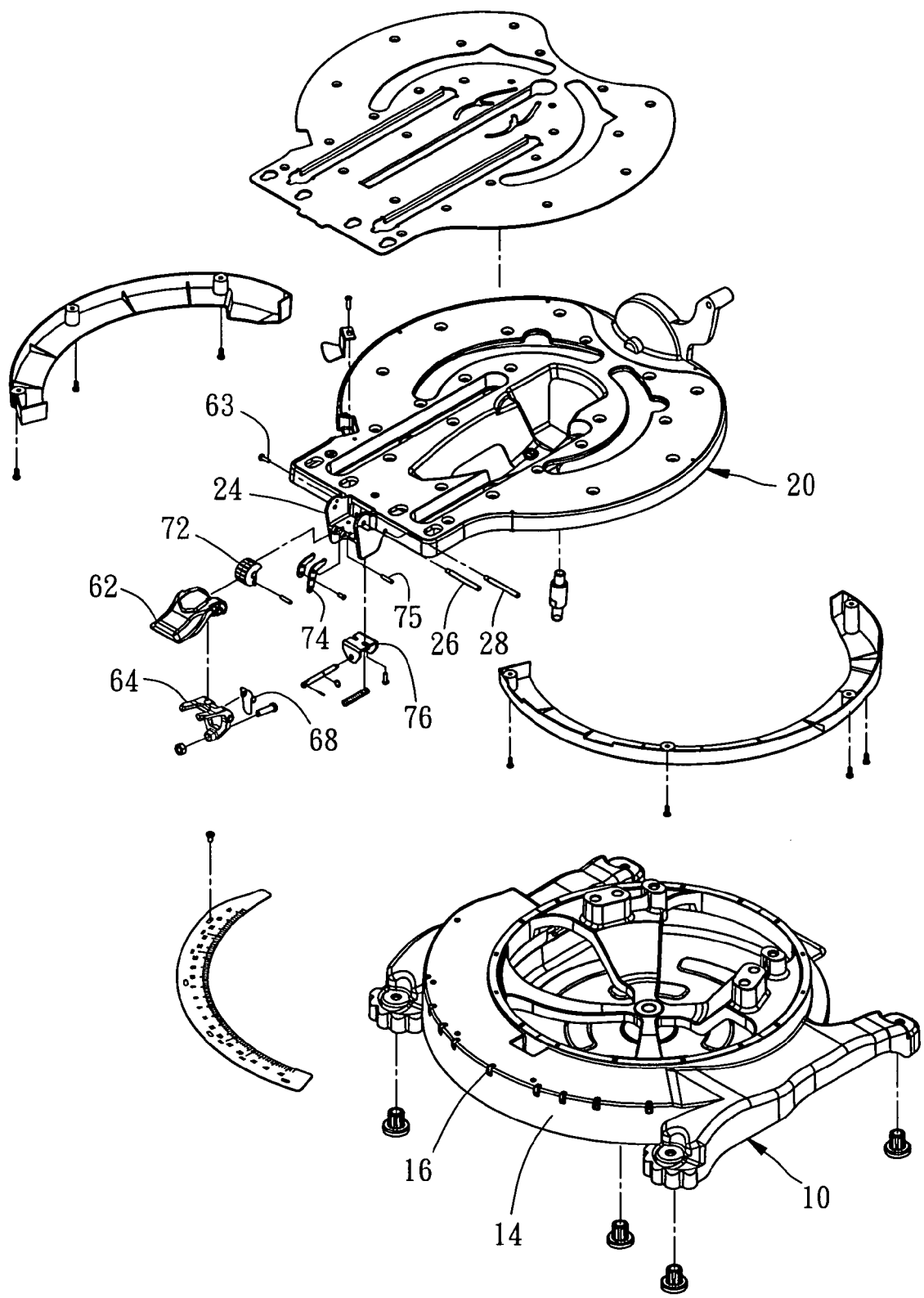
FIG. 2 is an exploded view of the worktable and the machine base of the preferred embodiment of the present invention.

Referring to FIGS. 1 and 2, a miter saw 100 is shown comprising a machine base 10, a worktable 20 rotatably mounted on the top side of the machine base 10, a fence 30 affixed to the machine base 10 with a screw bolt 32, a fixture 40 fastened to the worktable 20, and a saw blade assembly 50 coupled to the rear side of the worktable 20 and carrying a circular saw blade (not shown). When lowering the circular saw blade, the track of the circular saw blade defines with the bearing face 34 of the fence 30 a predetermined contained angle. This contained angle is indicated subject to the pointer 22 at the worktable 20 and the graduations 12 on the surface of the machine base 10. This contained angle is referred hereinafter as "cutting angle".

Figure 3:
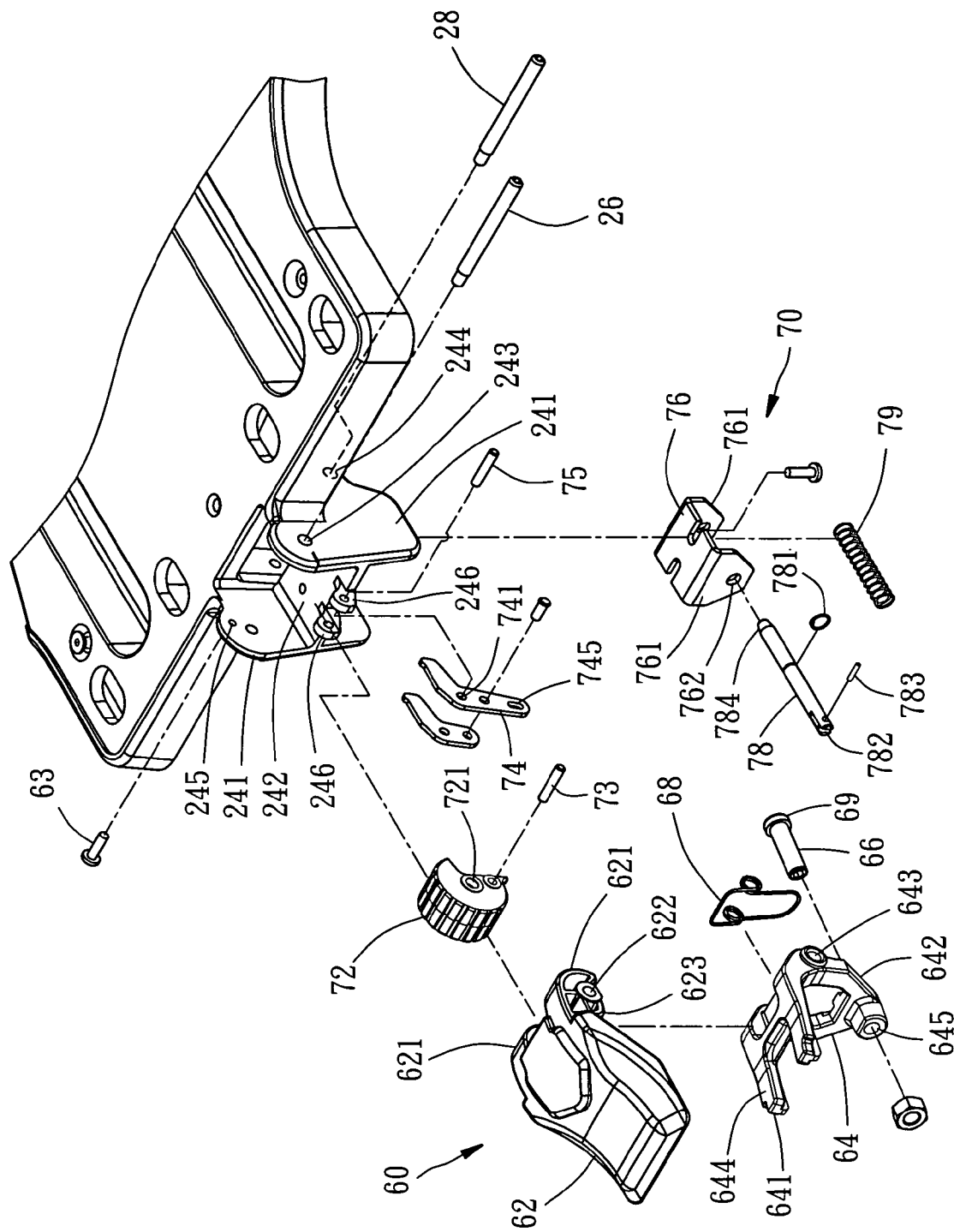
FIG. 3 is an enlarged view of a part of FIG. 2.
Figure 4:
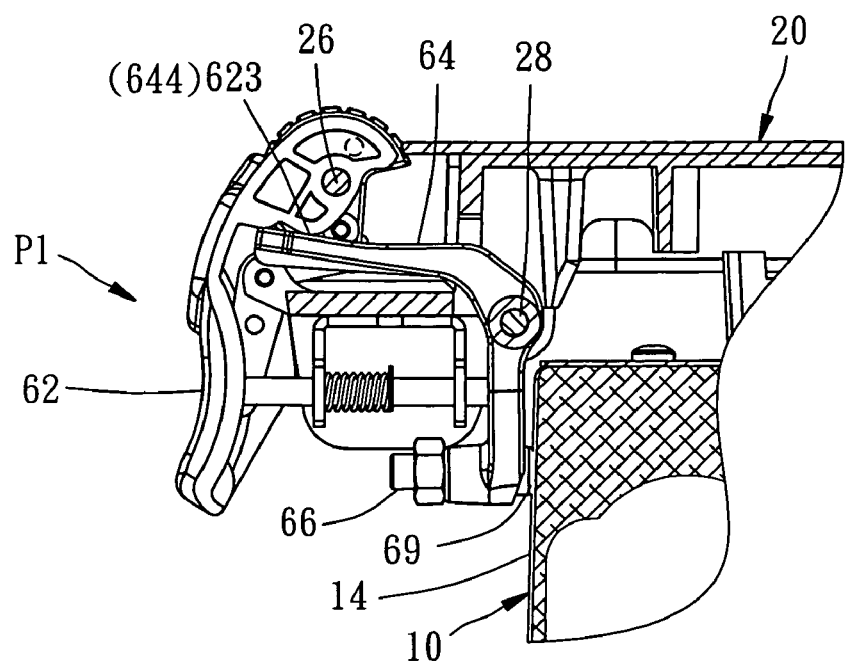
FIG. 4 is a sectional view of a part of the present invention, showing the handle of the first positioning unit in the lowered position.

The rotary worktable positioning structure of the present invention is installed in the front side of the worktable 20, comprising a first positioning unit 60 and a second positioning unit 70. The first positioning unit 60 provides a stepless positioning effect, i.e., allowing the worktable 20 to be positioned in any non-particular cutting angle. The second positioning unit 70 provides a rapid positioning effect to have the worktable 20 be positioned in one of a number of predetermined cutting angles, for example, 15-degrees, 30-degrees, etc. The structure and operation of the first positioning unit 60 are described at first as follows:

Referring to FIGS. 3 and 4, the worktable 20 has a forwardly protruding mounting frame 24. The mounting frame 24 comprises two wing panels 241 arranged in parallel, and a transverse panel 242 connected between the wing panels 241. Each wing panel 241 has a first through hole 243 and a second through holes 244 for the passing of a first pivot pin 26 and a second pivot pin 28 respectively. One wing panel 241 is processed to provide a threaded through hole 245. The first positioning unit 60 comprises a handle 62, a limiter formed of a screw bolt 63, a follower member 64, a locating block 66, and a return spring, for example, torsional spring 68.

The handle 62 has two lugs 621 bilaterally disposed at the front side. Each lug 621 has a pivot hole 622 for the passing of the first pivot pin 26 so that the handle 62 is pivotally connected to the mounting frame 24 of the worktable 20 and turnable about the first pivot pin 26 between a lowered position P1 (see FIG. 4) and a lifted position P2 (see FIG. 6). Each lug 621 has a bottom cam 623 (see also FIG. 7), a plurality of ribs 624 disposed at one lateral side, and an open space 625 defined between each two adjacent ribs 624 The screw bolt 63 is threaded into the threaded through hole 245 of the wing plate 241 and engaged into one open space 625 of the adjacent lug 621.

The follower member 64 comprises a first panel 641, a second panel 642 connected to the first panel 641 at right angles to show with the first panel 641 a L-shaped configuration, a through hole 643 in the connection area between the first panel 641 and the second panel 642 for the passing of the second pivot pin 28, an actuation portion 644 formed of the outer wall of the first panel 641 and stopped against the bottom cam 623 of the handle 62, and a mounting hole 645 extending through the bottom side of the second panel 642 remote from the first panel 641 for the passing of the locating block 66. The locating block 66 has an elastic member 69 at the front end, forming a working end.

Figure 5:
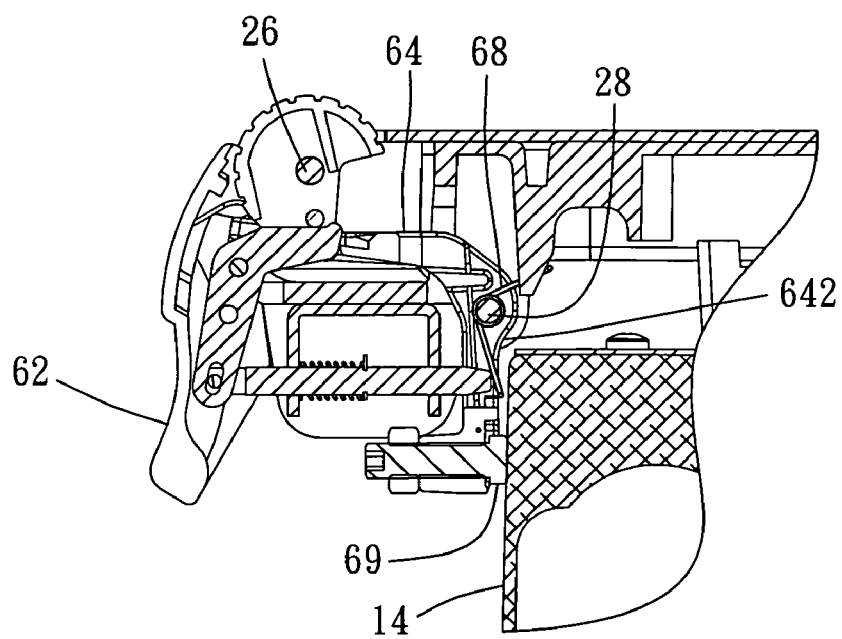
FIG. 5 is a sectional view of a part of the present invention, showing the position arrangement of the torsional spring of the first positioning unit.

The torsional spring 68 is sleeved onto the second pivot pin 28 before insertion of the second pivot pin 28 through the second through holes 244, as shown in FIG. 5. The torsional spring 68 has one end stopped against the bottom side of the worktable 20, and the other end stopped against the outer surface of the second panel 642 of the follower member 64. The torsional spring 68 imparts a pressure to the follower member 64, forcing the outer surface 644 of the first panel 641 into contact with the bottom cam 623 of each lug 621 of the handle 62.

After understanding of the structural features of the first positioning unit 60, the stepless positioning functioning of the first positioning unit 60 is outlined hereinafter.

Figure 6:
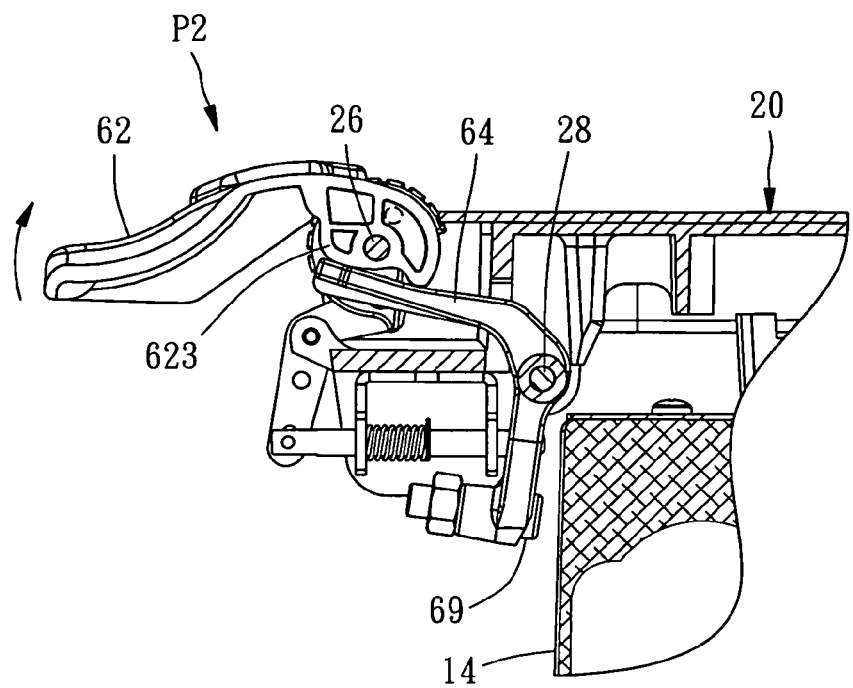
FIG. 6 is similar to FIG. 4, showing the handle of the first positioning unit moved to the lifted position.
Figure 7:
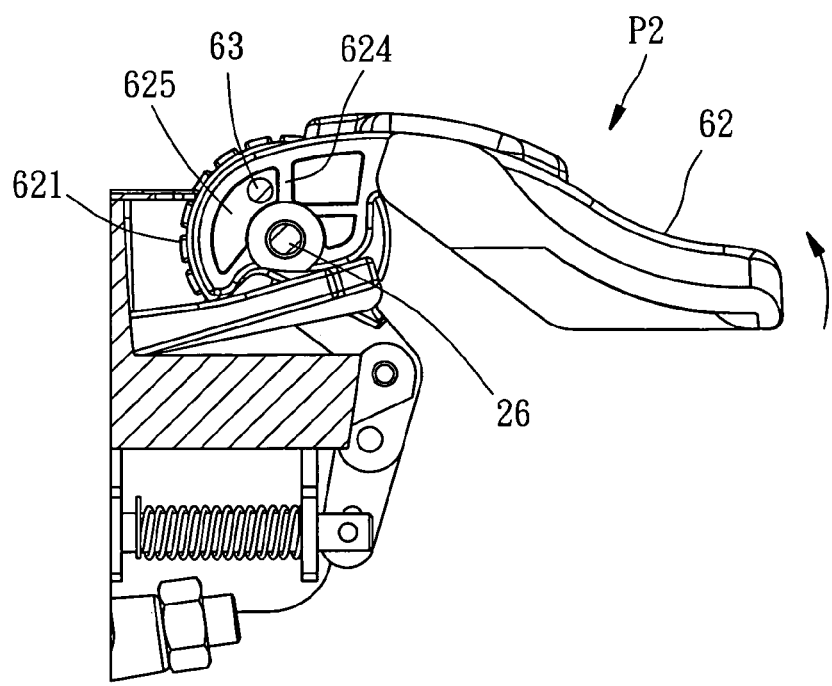
FIG. 7 is an enlarged scale of FIG. 6 when viewed from another side.

When in the state shown in FIGS. 4 and 5, the handle 62 is in the lowered position P1. At this time, the bottom cams 623 of the lugs 621 of the handle 62 are stopped against the outer surface 644 of the first panel 641 of the follower member 64, forcing the elastic member 69 of the locating block 66 to stop against the periphery 14 of the machine base 10, prohibiting the worktable 20 from rotation. At the same time, the follower member 64 compresses the torsional spring 68. When wishing the adjust the cutting angle, lift the handle 62 to change the position of the bottom cams 623, as shown in FIGS. 6 and 7. At this time, the torsional spring 68 releases the preserved energy to bias the follower member 64 and the handle 62 to the position where one rib 624 is stopped at the screw bolt 63, and therefore the handle 62 is positioned in the lifted position P2. Thus, the elastic member 69 of the locating block 66 is kept apart from the periphery 14 of the machine base 10, allowing the worktable 20 to be freely rotated to the desired cutting angle position. After adjustment of the worktable 20 to the desired cutting angle position, the handle 62 is biased in the reversed direction to force the elastic member 69 of the locating block 66 against the periphery 14 of the machine base 10, thereby locking the worktable 20 again.

The structure and operation of the second positioning unit 70 are described hereinafter.

Figure 8:
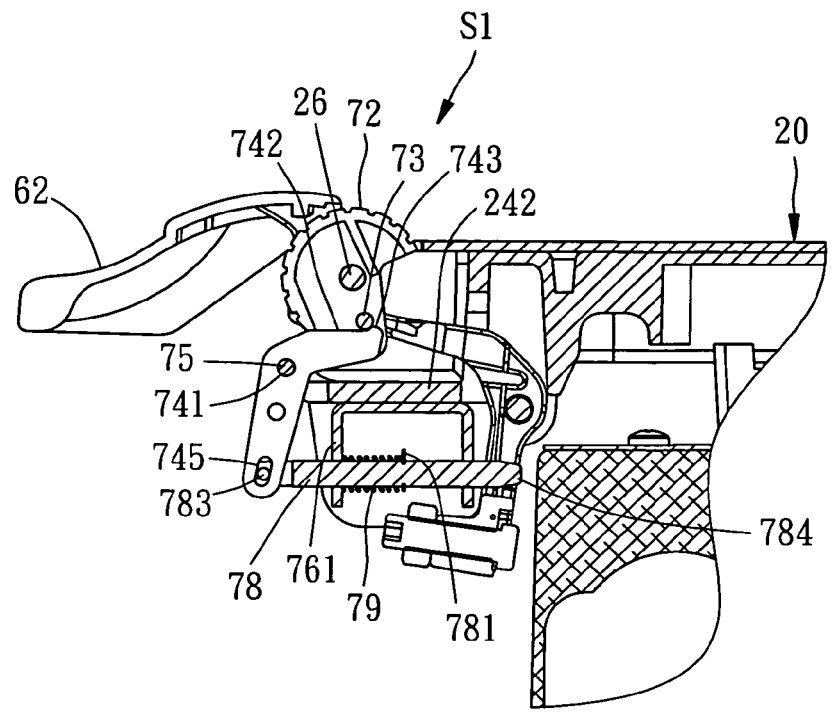
FIG. 8 is a sectional view of a part of the present invention, showing the non-work status of the first positioning unit and the second positioning unit.

Referring to FIG. 8 and FIG. 3, the second positioning unit 70 comprises a switch wheel 72, a link 74, a support 76, a lock pin 78, a spring member 79, and conical locating holes 16 on the periphery of the machine base 10. Each conical locating hole 16 represents one specific cutting angle.

The switch wheel 72 is a hollow member set between the two lugs 621 of the handle 62, having an axle hole 721 for the passing of the first pivot pin 26 so that the switch wheel 72 can be turned about the first pivot pin 26 between an inward position S1 and an outward position S2. Further, a pin 73 is inserted through the switch wheel 72, forming a driving member convenient for manipulation by a person's fingers.

The mounting frame 24 of the worktable 20 has two lugs 246 forwardly protruded from the transverse panel 242. The link 74 is a L-shaped plate member suspending between the two lugs 246, having a through hole 741 in the turning angle thereof. A third pivot pin 75 is inserted through the two lugs 246 and the through hole 741. The outer edge 742 of the upper part of the link 74 forms a driven portion that is kept in contact with the pin 73. The link 74 further has a switching point 744 near the end edge 743 of the upper part, and an elongated slot 745 in the lower part.

The support 76 is a substantially U-shaped frame member invertedly affixed to the bottom side of the transverse panel 242 of the mounting frame 24, having two parallel side panels 761 and a hole 762 in each side panel 761 for the passing of the lock pin 78. The lock pin 78 has its body mounted with a retainer ring 781, and its rear end provided with a clamping notch 782, which receives the bottom end of the lower part of the link 74. A pin 783 is inserted through the rear end of the lock pin 78 and the elongated slot 745 of the link 74 to pivotally couple the link 74 and the lock pin 78 together. Further, the lock pin 78 has a front end terminating in a cone head 784 that works as an engagement end.

The spring member 79 is sleeved onto the lock pin 78 and stopped with its one end against the retainer ring 781 and its opposite end against the inner surface of one side panel 761. The spring member 79 imparts a biasing force to the outer edge 742 of the upper part of the link 74 into contact with the pin 73.

After understanding of the structural features of the second positioning unit 70, the particular angle positioning functioning of the first positioning unit 60 is outlined hereinafter.

Figure 9:
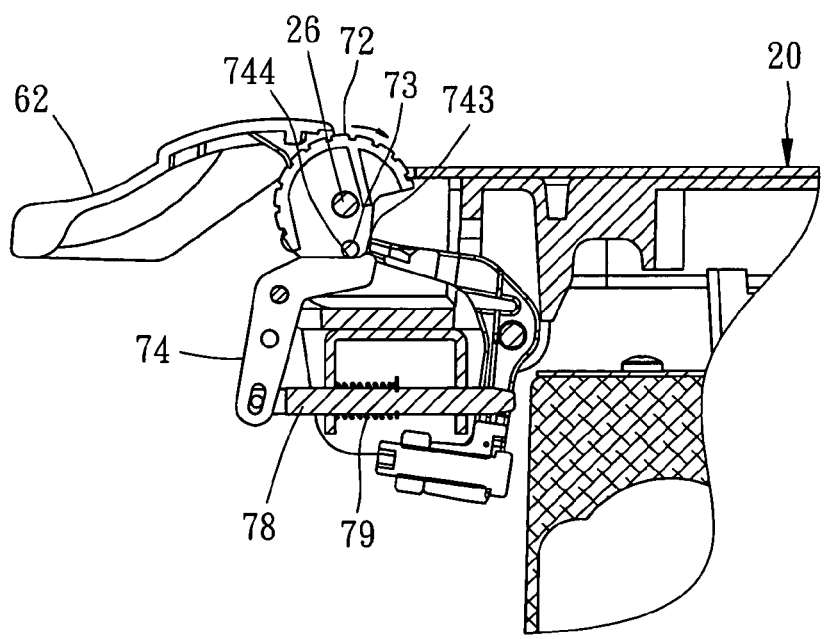
FIG. 9 is a sectional view of a part of the present invention, showing the pin of the second positioning unit moved to the switching point of the link.
Figure 10:
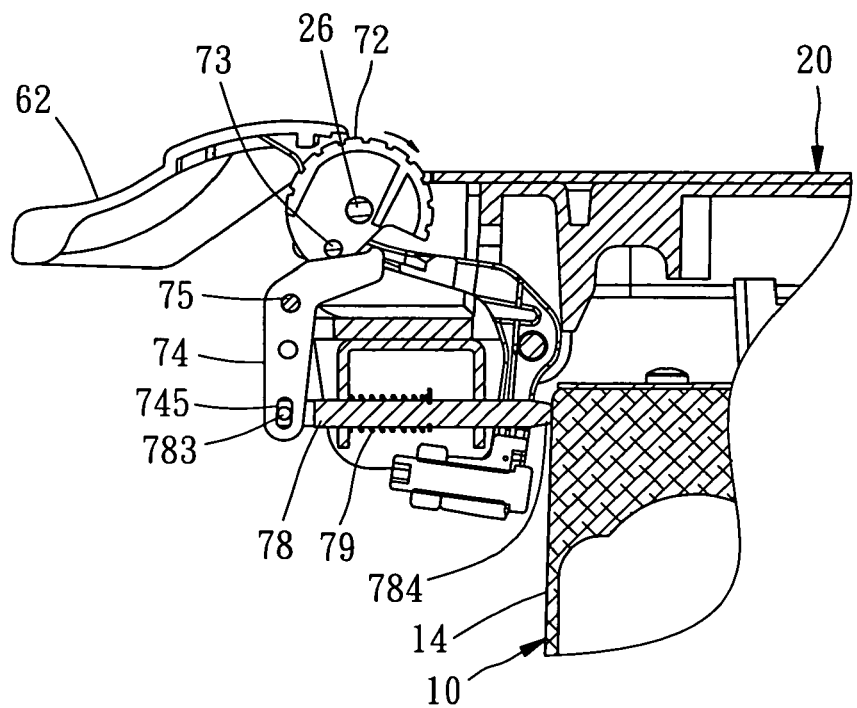
FIG. 10 is similar to FIG. 9, showing the front end of the lock pin stopped against the periphery of the machine base.
Figure 11:
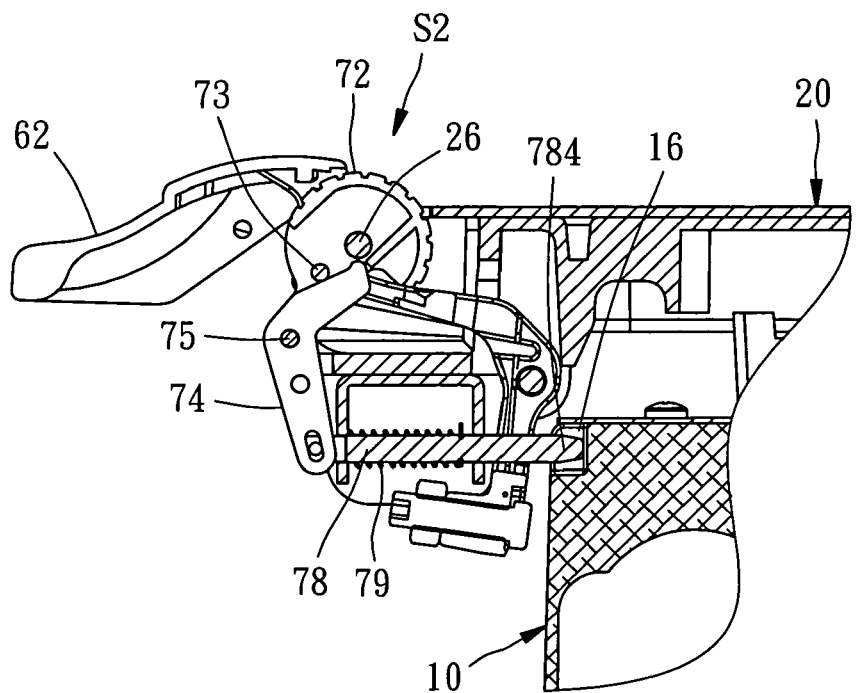
FIG. 11 is similar to FIG. 10, showing the front end of the lock pin engaged into one conical locating hole of the machine base.
Figure 12:
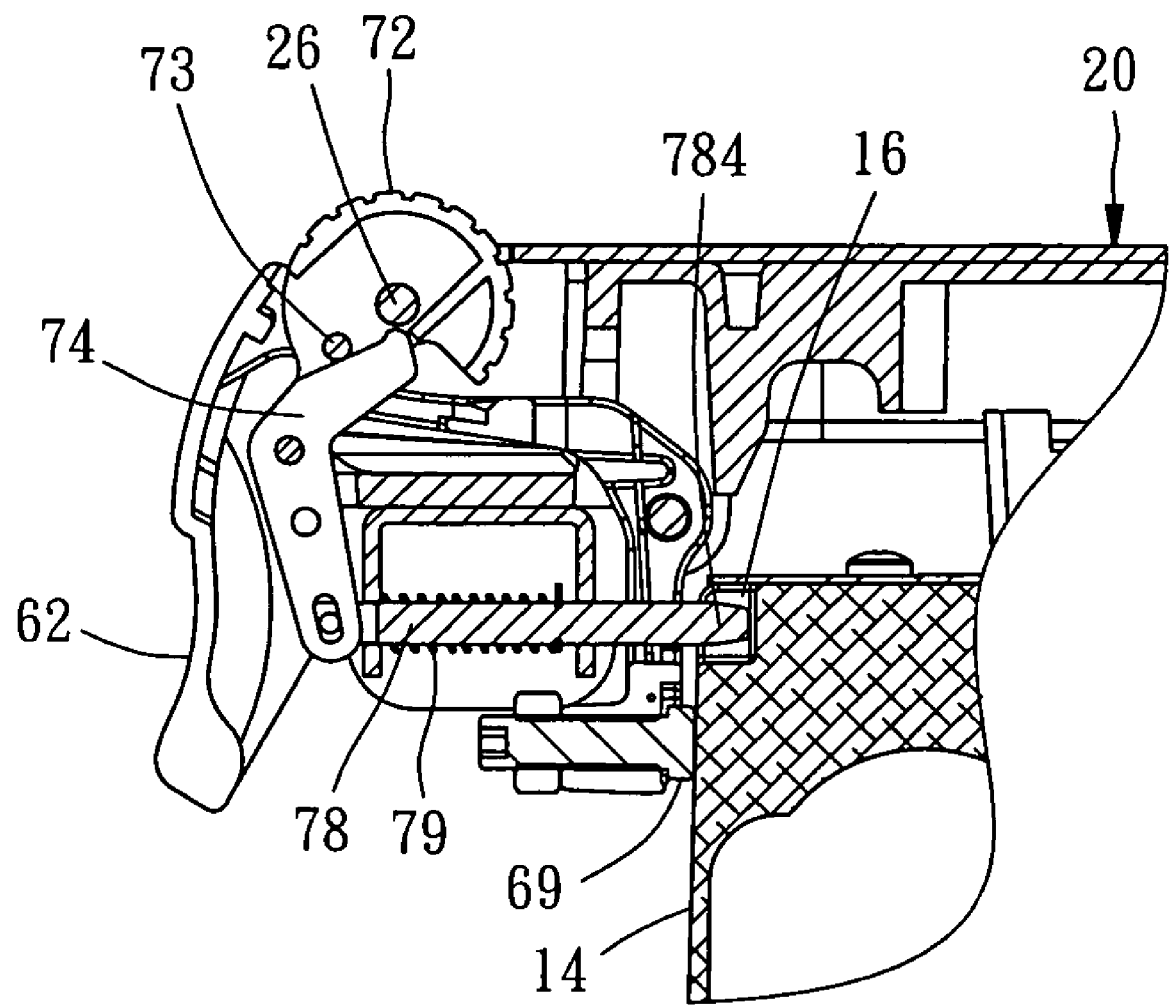
FIG. 12 is a sectional view of a part of the present invention, showing the first positioning unit and the second positioning unit in the locking position.

When in the state shown in FIG. 8, the first positioning unit 60 and the second positioning unit 70 do no work relative to the worktable 20, and therefore the worktable 20 is freely rotatable relative to the machine base 10. When wishing to position the worktable 20 in a particular cutting angle, rotate the worktable 20 relative to the machine base 10 to the desired angle subject to the assistance of the pointer 22 and the graduations 12. Thereafter, turn the switch wheel 72 in direction toward the inward position S1, as shown in FIG. 9. When the pin 73 moved over the switching point 744, the spring force of the spring member 79 moves the lock pin 78 toward the machine base 10 to force the cone head 784 of the lock pin 78 against the periphery 14 of the machine base 10, as shown in FIG. 10. At this time, adjust the worktable 20 to let the cone head 784 of the lock pin 78 be forced into the assigned conical locating hole 16 that represents the desired cutting angle position, as shown in FIG. 11, and therefore the worktable 20 is positioned in the desired cutting angle position. When wishing to release the worktable 20 from the constraint, reverse the switch wheel 72 in the direction toward the outward position S2 to have the pin 73 moved over the switching point 744 again, keeping the lock pin 78 away from the conical locating holes 16. At this time, the operator needs to lower the handle 62, as shown in FIG. 12, providing a double-locking positioning effect.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A rotary worktable positioning structure used in a miter saw, comprising:
   a machine base, said machine base having a plurality of locating holes spaced around the periphery thereof;
   a worktable rotatably supported on said machine base, said worktable comprising a forwardly protruding mounting frame, a first pivot pin, a second pivot pin and a third pivot pin, said first pivot pin and said second pivot pin and said third pivot pin being respectively inserted through said mounting frame;
   a handle pivotally coupled to said first pivot pin and turnable relative to said worktable between a lowered position and a lifted position;
   a follower member pivotally coupled to said second pivot pin and suspending below said handle, said follower member having an actuation portion and a working portion respectively disposed at two distal ends thereof, said actuation portion being moved by said handle to force said working portion against the periphery of said machine base when said handle is moved from said lifted position to said lowered position;
   a switch wheel pivotally coupled to said first pivot pin and turnable relative to said worktable between an inward position and an outward position, said switch wheel having a driving portion;
   a link pivotally coupled to said third pivot pin, said link having a driven portion at one end thereof and a dragging portion at an opposite end thereof, said driven portion being forced to work on said dragging portion and to cause turning of said link about said third pivot pin when said switch wheel is rotated; and
   a lock pin movable forwards and backwards in a straight direction, said lock pin having a rear end coupled to the dragging portion of said link and a front end terminating in an engagement portion, which is engaged into one said locating hole of said machine base when said switch wheel is in said inward position.

2. The rotary worktable positioning structure as claimed in claim 1, wherein said mounting frame of said worktable comprises two wing panels arranged in parallel, and a transverse panel connected between said wing panels, each said wing panel having a first through hole for the passing of said first pivot pin and a second through hole for the passing of said second pivot pin; said handle and said follower member are disposed between said two wing panels; said handle comprises a cam; said follower member is a L-shaped member having a first panel and a second panel connected to said first panel at right angles, said first panel having an outer wall that forms said working portion and disposed in contact with said cam, said second panel having a locating block fastened to a bottom side thereof, said locating block having a front end forming said working portion.

3. The rotary worktable positioning structure as claimed in claim 2, further comprising a return member sleeved onto said second pivot pin and adapted for imparting a pressure to force the outer wall of said first panel into contact with said cam.

4. The rotary worktable positioning structure as claimed in claim 3, wherein said handle has a plurality of ribs at one side thereof and an open space defined between each two adjacent ribs; one said wing panel of said mounting frame has a through hole and a limiter inserted through the through hole and engageable into one open space of said handle to stop said handle in said lifted position.

5. The rotary worktable positioning structure as claimed in claim 2, wherein said handle comprises two lugs bilaterally disposed at a front side thereof, each lug of said handle having a pivot hole for the passing of said first pivot pin; said switch wheel is disposed between the two lugs of said handle, having an axle hole for the passing of said first pivot pin; said mounting frame comprises two lugs forwardly protruded from said transverse panel; said link is a L-shaped plate member suspending between the two lugs of said mounting frame and having a through hole in a turning angle thereof; said third pivot pin is inserted through the two lugs of said mounting frame and the through hole of said link; said mounting frame has a support affixed to a bottom side of said transverse panel, said support having two parallel side panels and a hole in each side panel for the passing of said lock pin.

6. The rotary worktable positioning structure as claimed in claim 5, wherein said switch wheel has a pin inserted therethrough to form said driving portion; said lock pin has a retainer ring fastened to a body thereof and a spring member sleeved onto the body and stopped between said retainer ring and one side panel of said support to force an outer edge of an upper part of said link against the pin of said switch wheel.

7. The rotary worktable positioning structure as claimed in claim 6, wherein said link has a switching point on the outer edge of the upper part thereof; the spring member that is mounted on said lock pin forces said lock pin into one said locating hole of said machine base when the pin of said switch wheel is moved over the switching point of said link during rotation of said switch wheel toward said inward position; said lock pin is kept away from said locating holes of said machine base when the pin of said switch wheel is moved over the switching point of said link during rotation of said switch wheel toward said outward position.

8. A rotary worktable positioning structure used in a miter saw, said miter saw comprising a machine base and a worktable rotatably supported on said machine base, said rotary worktable positioning structure comprising:
   a first positioning unit, said first positioning unit comprising a handle and a locating block, said handle being pivotally connected to a front side of said worktable with a first pivot pin and turnable relative to said worktable between a lowered position and a lifted position, said locating block being stopped against the periphery of said machine base when said handle is in said lowered position, said locating block being kept apart from the periphery of said machine base when said handle is in said lifted position; and
   a second positioning unit, said second positioning unit comprising a switch wheel, a lock pin, and a plurality of locating holes formed on and spaced around the periphery of said machine base, said switch wheel coupled to said first pivot pin and turnable about said first pivot pin between an inward position and an outward position, said lock pin being engaged into one said locating hole when said switch wheel is in said inward position, said lock ping being kept apart from said locating holes when said switch wheel is said outward position.

9. The rotary worktable positioning structure as claimed in claim 8, wherein said first positioning unit comprises a mounting frame forwardly protruding from said worktable, and a follower member pivotally connected to said mounting frame with a second pivot pin, said follower member having an actuating portion disposed at one end thereof and a working portion disposed at an opposite end thereof, said working portion being formed of said locating block; said handle is pivotally connected to said mounting frame by said first pivot pin, having a cam at a front side thereof, said actuation portion being moved by said handle to force said working portion against the periphery of said machine base when said handle is moved from said lifted position to said lowered position.

10. The rotary worktable positioning structure as claimed in claim 9, wherein said first positioning unit further comprises a return spring sleeved onto said second pivot pin and adapted for providing a spring force to force said actuation portion of said follower member in contact with the cam of said handle.

11. The rotary worktable positioning structure as claimed in claim 10, wherein said handle has a plurality of ribs at one side thereof and an open space defined between each two adjacent ribs; said first positioning unit further comprises a stopping screw bolt fastened to said mounting frame and engageable into one open space of said handle to stop said handle in said lifted position.

12. The rotary worktable positioning structure as claimed in claim 9, wherein said handle comprises two lugs bilaterally disposed at a front side thereof, each lug of said handle having a pivot hole for the passing of said first pivot pin; said switch wheel is disposed between the two lugs of said handle, said switch wheel having an axle hole for the passing of said first pivot pin, and a driving portion; said second positioning unit further comprises a L-shaped link pivotally connected to said mounting frame with a third pivot pin, said L-shaped link having a driven portion disposed at one end thereof and movable by said driving portion and a dragging portion disposed at an opposite end thereof; said lock pin is disposed at a bottom side of said mounting frame and movable forwards and backwards in a straight direction, said lock pin having a rear end coupled to said dragging portion and a front end terminating in an engagement portion that is engaged into one said locating hole when said switch wheel is in said inward position.

13. The rotary worktable positioning structure as claimed in claim 12, wherein said second positioning unit further comprises a support affixed to a bottom side of said mounting frame, said support having two parallel side panels and a hole in each side panel for the passing of said lock pin, a retainer ring fastened to said lock pin, and a spring member sleeved onto said pin and stopped between one side panel of said support and said retainer ring to impart a pressure to said lock pin in direction toward one said locating hole of said machine base.

* * * * *